United States Patent Office 3,833,651
Patented Sept. 3, 1974

3,833,651
PROCESS FOR THE PREPARATION OF
DL-METHIONINE
Shunji Ouchi and Chisei Shibuya, Tokyo, Japan, assignors to Deutsche Gold- und Silber-Scheideanstalt vormals Roessler, Frankfurt, Germany
No Drawing. Filed Aug. 5, 1971, Ser. No. 169,495
Claims priority, application Japan, Aug. 12, 1970, 45/70,105
Int. Cl. C07c 149/20
U.S. Cl. 260—534 S                              5 Claims

ABSTRACT OF THE DISCLOSURE

Improved process for the preparation of DL-methionine wherein the addition reaction of methyl mercaptan and hydrocyanic acid to acrolein and the hydantoin ring forming reaction are simultaneously effected in one-stage to give a hydantoin type intermediate, which is then hydrolyzed. The process can be simply and easily conducted to obtain high purity DL-methionine in high yield at low cost.

---

This invention relates to improvements in the preparation of DL-methionine, and more particularly to a process for the preparation of DL-methionine which comprises reacting acrolein with methyl mercaptan, hydrocyanic acid, a source of ammonium ion, and a source of carbonate ion in the presence of a solvent to accomplish an addition reaction of the methyl mercaptan and hydrocyanic acid to the acrolein simultaneously with a hydantoin ring forming reaction follwed by hydrolysis of the resulting product.

For preparing DL-methionine through a hydantoin ring forming reaction, there have conventionally and generally been known the methods which can be illustrated as follows.

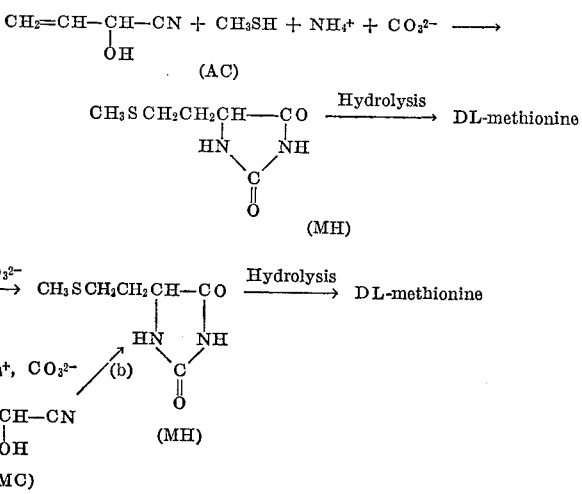

Stated in detail, U.S. Pat. Nos. 2,527,366 and 2,557,913 and British Pat. No. 630,139 disclosed the route (a) in which DL-methionine can be obtained by reacting β-methylthiopropionaldehyde (hereinafter referred to simply as "MA"), which is prepared by an addition reaction between acrolein and methyl mercaptan, with a cyanide, ammonia and carbonic acid to effect a hydantoin ring forming reaction and subsequently subjecting the resulting hydantoin derivatives, for example 5-(β-methylthioethyl) hydantoin (hereinafter referred to simply as "MH") to hydrolysis. As a modified process of the route (a), British Pat. No. 653,803, Japanese Patent Application Publication No. 14,688/1964 and the Journal of the American Chemical Society 70, 1450 (1948) disclosed the route (b) in which DL-methionine can be prepared by subjecting MA to an addition reaction with hydrocyanic acid to give α - hydroxy-γ-methyl-mercaptobutyronitrile (hereinafter referred to simply as "MC") followed by the hydantoin ring forming reaction of the MC and subsequently by hydrolysis.

Meanwhile, with regard to a method of producing MA to be employed as a starting material in the above-mentioned conventional processes, it has been proposed in, for example, U.S. Pat. Nos. 2,485,236 and 2,527,366 and Japanese Patent Application Publication No. 19,090/1965 that acrolein is subjected to an addition reaction with methyl mercaptan in the presence of a catalyst such as an organic base or organic base-carboxylic acid.

However, the conventional methods as mentioned above, are accompanied by some drawbacks. For example, in the preparation of MA by the addition reaction between methyl mercaptan and acrolein, the excessive amount of methyl mercaptan is required and, in addition, the yield of the desired MA is not so high. The route (b) as mentioned before, is necessarily conducted in two steps, namely MC-producing step of the addition reaction of hydrocyanic acid to MA and step of hydantoin ring forming reaction of the MC, and accordingly is complicated in operation. Moreover, in the route (b), the addition reaction of hydrocyanic acid usually needs a catalyst.

In order to overcome the drawbacks of the above-mentioned conventional processes, it has already been proposed by the present inventors to prepare DL-methionine by reacting acrolein cyanhydrin (hereinafter referred to simply as "AC") with methyl mercaptan, a source of ammonia ion and a source of carbonate ion in the presence of an organic or aqueous organic solvent and subsequently hydrolyzing the resulting intermediate, as illustrated by the following reaction formula (Japanese Patent Application No. 38,629/1970).

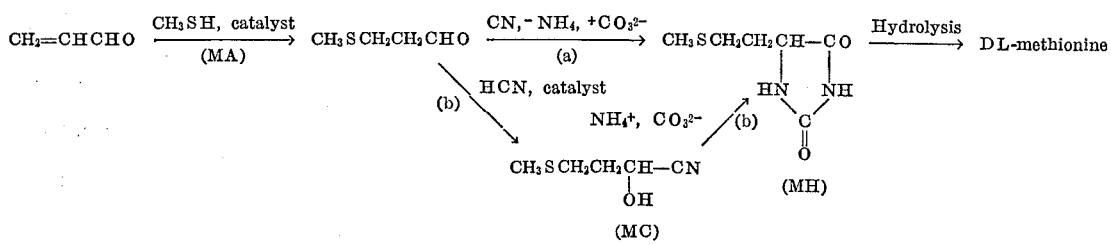

The present inventors have further made an intensive study with regard to improved process for the synthesis of DL-methionine starting from acrolein. As a result, it has been found that, in the preparation of DL-methionine from acrolein through a hydantoin ring forming reaction, DL-methionine can be obtained by reacting methyl mercaptan, hydrocyanic acid, a source of ammonium ion and a source of carbonate ion in one stage followed by hydrolysis. It has also been found that when the one-stage reaction as mentioned above is effected in the presence of a reaction medium selected from the group consisting of water, an organic solvent and an aqueous organic solvent, the desired reaction can smoothly proceed without causing any loss of acrolein due to polymerization thereof to obtain DL-methionine in high yield. The present invention has been made on the basis of such novel findings.

Thus, according to the present invention, there is provided a process for the preparation of DL-methionine which comprises reacting acrolein, methyl mercaptan, hydrocyanic acid, a source of ammonium ion and a source of carbonate ion in a reaction medium to accomplish an addition reaction between acrolein, methyl mercaptan and hydrocyanic acid simultaneously with a hydantoin ring forming reaction followed by hydrolysis of the resulting hydantoin type intermediate. Thereby, there can be simply and economically produced high purity DL-methionine in high yield.

The process according to the present invention can be illustrated by the following reaction formula:

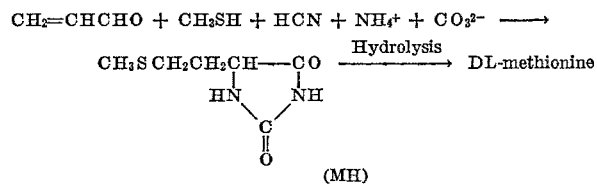

(MH)

As apparent from the foregoing, as opposed to the conventional two-stage process wherein acrolein is first reacted with an excessive amount of methyl mercaptan in the presence of a basic catalyst followed by a hydantoin ring forming reaction of the resulting MA to obtain the hydantoin type intermediate in relatively poor yield, according to the present invention, the starting acrolein and the reactants are reacted in one-stage to produce the hydantoin type intermediate. Thus, the process of the present invention results in simplification of the reaction procedure as well as reduction of the required amount of methyl mercaptan. The yield of the desired product is remarkably improved.

In addition, its is to be noted that the reaction of the present process can advantageously proceed stably even in the presence of water in the reaction system. In the conventional process mentioned before, the addition reaction of methyl mercaptan to acrolein is carried out in the presence of a small amount of a basic catalyst in an anhydrous system, and it is a common knowledge that water has an adverse effect on the addition reaction. On the other hand, there has been proposed a process wherein the addition reaction is performed in an aqueous solution, employing a very weakly basic catalyst. (See Japanese Patent Application Publication No. 19,090/ 1965.) However, it is surprising that, according to the present invention, the addition reaction can smoothly, stably proceed in an aqueous solution even in the presence of a large amount of a so-called hydantoin ring forming reagent consisting of a source of ammonium ion which is a basic substance and a source of carbonate ion.

Generally, acrolein to be employed as a starting material in the process of this invention is unstable under the alkaline condition, especially in an aqueous solution. For example, when acrolein is added to an aqueous solution of ammonium carbonate, a representative hydanation ring forming reagent to be used in the present process, the resulting solution is immediately subject to generation of heat and colored, and polymerization occurs. Further, when acrolein and ammonium carbonate are added to absolute methanol and heated at 50° C. for 1 hour, there is obtained a by-product of a greatly colored resinous substance and acrolein is scarcely recovered. In the process of this invention, acrolein is reacted directly with methyl mercaptan, hydrocyanic acid and a hydantoin ring forming reagent. The hydantoin ring forming reagent comprises a basic material which would have a detrimental influence on acrolein to cause polymerization thereof, but the hydantoin ring forming reaction in the present process can smoothly proceed unexpectedly without any side reactions such as polymerization of acrolein though the reaction system is basic. For proving the specific effect of the present invention, the comparative experiment was conducted as follows: acrolein and hydrocyanic acid were reacted with ammonium carbonate in the absence of methyl mercaptan, and, as a result, there was initiated polymerization of acrolein to show that acrolein could not be stably present under such condition. Accordingly, it is apparently surprising that the addition reaction of methyl mercaptan and hydrocyanic acid to acrolein and the hydantoin ring forming reaction using a hydantoin ring forming reagent comprising a source of ammonium ion and a source of carbonate ion are accomplished, accompanied by no side reactions, to obtain the desired product in high yield.

Acrolein to be employed as a starting material in the process of this invention may be used after purified by distillation or in the form of solution in a suitable solvent. In this invention, it is desirable for completely preventing vinyl polymerization of acrolein to employ a small amount of stabilizer in the reaction system. Such stabilizer may be a generally utilized vinyl polymerization inhibitor. Examples of suitable stabilizers include phenol compounds such as hydroquinone, methoxyhydroquinone, resorcin, bisphenol A and naphthoquinone, aromatic amino compounds such as naphthylamine, p-phenylenediamine, N-phenyl-β-naphthylamine and N,N' - diphenyl-p-phenylenediamine; and copper powder. The stabilizer may generally be employed in an amount of 1% by weight or less based on the weight of the acrolein.

The methyl mercaptan to be employed in the process of the present invention may be of a gaseous or liquid form. The amount of methyl mercaptan to be employed may be of an equivalent to acrolein but preferably of a somewhat excess.

The amount of hydrocyanic acid to be employed in the process of the present invention may generally be of an equi-mole or more to acrolein, but the use of more than 2 mols of the acid per mol of acrolein causes a side reaction to reduce the yield of the desired product. Some substance capable of supplying cyanide ion may be used instead of hydrocyanic acid, but in this instance, side reactions are frequently caused.

With respect to the reagents for forming a hydantoin ring; namely a source of ammonium ion, and a source of carbonate ion, the former include gaseous ammonia, liquid ammonia, ammonium carbonate, ammonium bromide, ammonium chloride, ammonium sulfate, ammonium acetate, ammonium cyanide, ammonium carbamate, ammonium hydrogencarbonate and the like, and the latter include carbon dioxide gas, solid carbonic acid, ammonium carbonate, ammonium carbamate, ammonium hydrogencarbonate, sodium carbonate and the like. As apparent from the above, a source of ammonium ion may be the same with a source of carbonate ion. The amount to be employed is not critical, but there may be usually employed such an amount to be utilized in a conventional hydantoin ring forming reaction, for example, 1 to 4 molar equivalents, preferably 1.5 to 3 molar equivalents to acrolein.

In carrying out the first step, i.e., the hydantoin ring forming reaction simultaneously with addition reaction in the process of this invention, the reaction may suitably be effected in the presence of a reaction medium selected from the group consisting of water, an organic solvent and an aqueous organic solvent. Even in the absence of such reaction medium, the reaction may theoretically proceed, but it is not practical because of the low yield of the desired product. As the organic solvents, there may be employed any of those organic solvents that could not decompose during the reaction and would be inert to the reaction. Examples of these organic solvents include such common solvents as alcohols, alcohol ethers, nitriles, nitroalkanes, amides, amines, ethers, hydrocarbons, halogenated hydrocarbons and the like. In particular, lower aliphatic alcohols, lower aliphatic nitriles, nitroalkanes, alcohol ethers, dialkyl sulfoxides, dialkylformamides, dialkylacetamides, hexaalkyl phosphoramides, cyclic amines and the like are preferable since they can give the favourable results. Illustrative examples of these preferable solvents are methanol, ethanol, isopropanol, n-propanol, tert. butanol, n-butanol, ethylene glycol, acetonitrile, propionitrile, malononitrile, succinonitrile, ethylene glycol monomethyl ether, nitromethane, nitroethane, dimethylformamide, dimethylacetamide, N-methylpyrrolidone, dimethyl sulfoxide, hexamethyl phosphoramide, pyridine and the like. When water is employed as a reaction medium, the velocity of solution of acrolein and methyl mercaptan into the reaction medium is lowered whereby the rate of reaction tends to be depressed. However, by effecting the reaction for the sufficient period of time, the fully acceptable yield can be obtained even when water is employed. On the other hand, in case an aqueous organic solvent, i.e., mixture of organic solvent and water is employed, the depressions of velocity of solution of the reactants into the solvent and of the reaction rate are not observed even when the reactants are charged in high concentration. The ratio of water to an organic solvent may be suitably chosen according to reactants-charging condition as well as reaction condition.

The reaction of this step is effected at a temperature ranging from about 30° C. to about 200° C. and preferably at about 40 to 150° C. in view of rate of reaction, selectivity in the reaction and other factors.

The reaction period in this step is not critical, but the reaction may be usually completed in about 0.5 to 3 hours.

In operation, as described, acrolein, methyl mercaptan, hydrocyanic acid, a source of ammonium ion and a source of carbonate ion are reacted in the presence of a reaction medium at a temperature of 30° C. to 200° C. to accomplish an addition reaction of the methyl mercaptan and hydrocyanic acid to acrolein simultaneously with a hydantoin ring forming reaction. The hydantoin type intermediate thus obtained is then subjected to the second step, i.e. hydrolysis. Before hydrolysis, it is desirable to preliminarily distil the reaction medium or solvent from the reaction mixture comprising the hydantoin type intermediate. The operation of hydrolysis may be conducted according to the method commonly employed in the hydrolysis of hydantoin. The method of hydrolysis involves, for example, heating in the presence of a suitable base or acid. Suitable examples of the bases include alkali metal hydroxides, e.g., sodium or potassium hydroxide; alkaline earth metal hydroxides, e.g., calcium or barium hydroxide; alkali metal carbonates, e.g., sodium or potassium carbonate; and the like. Suitable examples of the acids include inorganic acids, e.g., hydrochloric or sulfuric acid; and organic acids, e.g., acetic or propionic acid.

After completion of the second step in the process of this invention, the desired product, DL-methionine, can be easily recovered, as pure crystals from the reaction mixture through ioslation and purification by a conventional method for instance, by the treatment with a suitable ion exchange resin or by neutralization.

Some illustrative advantages, in respect to known methods, obtained by the present process for preparing DL-methionine are summarized as follows.

(1) The step for the addition reaction of acrolein with methyl mercaptan is not required; the addition reaction of methyl mercaptan and hydrocyanic acid to acrolein and the hydantoin ring forming reaction can be accomplished in one-stage without any loss due to the polymerization of acrolein, rendering the process simple;

(2) As acrolein is unstable, in a conventional method wherein the addition reaction of acrolein with methyl mercaptan is carried out separately, an excessive amount of methyl mercaptan and a catalyst are required. By contrast, according to the present invention, the amount of methyl mercaptan may be substantially of an equivalent to acrolein, and no catalyst is required;

(3) The addition reaction of acrolein with methyl mercaptan is necessarily carried out in an anhydrous condition, but in the process of this invention, it can be satisfactorily performed in the presence of water; and (4) There are obtained particularly high yield with respect to acrolein and high purity of the final product, titer in DL-methionine of 99 to 99.5%.

This invention is more fully illustrated by the following examples, which are given solely for the purpose of illustrating this invention and should not be construed to be limiting the scope of this invention.

EXAMPLE 1

56 g. of acrolein containing 0.1% by weight of N-phenyl-$\beta$-naphthylamine, 48 g. of methyl mercaptan, 27 g. of hydrocyanic acid and 240 g. of ammonium carbonate together with 1000 ml. of methanol were charged into an autoclave having a capacity of 2 liters while cooling externally. The resulting mixture was heated with stirring at 80° C. for 1.5 hours. After completion of the reaction, the reaction mixture was concentrated under reduced pressure and then, to the resulting brown solid were added 600 ml. of 3N NaOH. The resulting mixture was heated to hydrolyze at 160° C. for 1.5 hours. The reaction mixture was passed through Amberite-200 (trade name of ion exchange resin), which was then eluted with a 5% aqueous ammonia. The eluate so obtained was treated with active carbon and then, concentrated and recrystallized from water to give 134 g. of DL-methionine as crystals.

EXAMPLE 2

Into an autoclave having a capacity of 300 ml. were charged 5.6 g. of acrolein containing 0.1% by weight of hydroquinone, 6.5 ml. of methyl mercaptan, 3.2 g. of hydrocyanic acid and 24 g. of ammonium bicarbonate together with 200 ml. of water containing no oxygen. After replacement of the atmosphere in the autoclave by nitrogen gas, the mixture was heated at 80° C. for 1.5 hours with stirring. The reaction mixture was concentrated under reduced pressure to distil off a part of the solvent and the reactants remaining unreacted, and 100 ml. of 2N NaOH were added to the residue, which was then diluted with water to make up the whole amount to 200 ml. The resulting mixture was heated at 160° C. for 1.5 hours. The reaction product was treated in the same manner as described in Example 1 to give 12.0 g. of DL-methionine.

EXAMPLE 3

A series of reactions using a variety of organic solvents were carried out as follows.

Into a stainless steel pressure reactor having a capacity of 100 ml. were charged 2.24 g. of acrolein containing 0.1% by weight of methoxyhydroquinone and 9.5 g. of ammonium bicarbonate together with 40 ml. of an organic solvent indicated below. The reactor was cooled to —30° C. externally with Dry Ice-methanol. Separately, 2.0 g. of cold liquid methyl mercaptan were withdrawn from a bomb and introduced into the reactor. 1.1 g. of liquid hydrocyanic acid were also added to the reactor. The reactor was then sealed and shaken in an oil bath at 70° C. for 2 hours. Thereafter, the solvent and the reactants remaining unreacted were removed from the reaction mixture. To the residue, 40 ml. of 2N aOH were added and the mixture was hydrolyzed at 160° C. for 1.5 hours. The reaction product was treated in the same manner as described in Example 1 to give DL-methionine at the yield indicated below (based on acrolein).

| Organic solvent: | Yield of DL-methionine (percent) |
|---|---|
| Methanol | 89.2 |
| Ethanol | 88.5 |
| Ethylene glycol | 80.6 |
| Acetonitrile | 86.5 |
| Dimethylformamide | 85.5 |
| Tetrahydrofuran | 75.6 |
| Dimethylsulfoxide | 82.1 |
| Chloroform | 76.2 |
| Benzene | 74.8 |
| Acetone | 73.0 |
| Ethyleneglycol monomethyl ether | 76.3 |

EXAMPLE 4

A series of the same procedures as described in Example 3 were repeated except that the mixture of water and methanol was used as the reaction medium or solvent. The results are summarized hereinbelow.

| Methanol (ml.) | Water (ml.) | Yield of DL-methionine (percent) |
|---|---|---|
| 40 | 0 | 86.5 |
| 30 | 10 | 84.0 |
| 20 | 20 | 83.5 |
| 10 | 30 | 82.3 |
| 0 | 40 | 81.1 |

EXAMPLE 5

Into a pressure reactor having a capacity of 100 ml. were charged 2.24 g. of acrolein containing 0.1% by weight of naphthylamine, 2.0 g. of methyl mercaptan, 1.1 g. of hydrocyanic acid and 3 molar equivalents of a hydantoin ring forming reagent as shown below together with methanol. The reaction was then carried out in the same manner as described in Example 3. The results are summarized hereinbelow.

| Hydantoin ring forming reagent: | Yield of DL-methionine (percent) |
|---|---|
| Ammonium carbonate | 88.1 |
| Ammonium bicarbonate | 88.8 |
| Ammonium carbamate | 85.6 |
| Liquid ammonia | |
| Solid carbon dioxide | 86.5 |
| Ammonium chloride | |
| Sodium carbonate | 83.1 |

EXAMPLE 6

A series of the same procedures as described in Example 3 were repeated except that methanol was employed as the solvent. The relationship between the temperature of hydantoin ring forming reaction and the yield of DL-methionine is given summarized hereinbelow.

| Temperature of hydantoin ring forming reaction (° C.): | Yield of DL-methionine (percent) |
|---|---|
| 60 | 85.1 |
| 80 | 88.2 |
| 100 | 87.9 |
| 120 | 84.5 |
| 150 | 77.1 |

EXAMPLE 7

The particularly suitable hydrolyzing reagents were investigated. As the raw material for hydrolysis reaction was employed the 1/10 amount of the concentrated solid substance obtained by the hydantoin ring forming reaction under the same conditions as described in Example 1. To the raw material for the reaction, 3 molar equivalents of sodium hydroxide, barium hydroxide and calcium hydroxide were separately added. 150 ml. of water were added and then the mixture was subjected to hydrolysis in an autoclave having a capacity of 300 ml. at 160° C. for 3 hours. The reaction mixture obtained with the sodium hydroxide was treated with Amberite-200. While, in the case that barium hydroxide or calcium hydroxide was used for hydrolysis, barium or calcium value was removed by blowing carbonic acid gas in. As a result, refined DL-methionine was obtained. The yields are shown herebelow.

| Hydrolyzing reagent: | Yield of methionine (based on acrolein) (percent) |
|---|---|
| Sodium hydroxide | 89.1 |
| Barium hydroxide | 88.1 |
| Calcium hydroxide | 88.6 |

What is claimed is:

1. A process for the preparation of DL-methionine which comprises reacting at a temperature of 30 to 200° C. acrolein with at least an equivalent amount of methyl mercaptan, 1–2 mols hydrocyanic acid per mol of acrolein, ammonia or a source of ammonium ion in an amount of 1–4 mols per mol of acrolein, and carbon dioxide or a source of carbonate ion in an amount of 1–4 mols per mol of acrolein in the presence of a solvent selected from the group consisting of water, methanol, ethanol, isopropanol, n-propanol, tert. butanol, n-butanol, ethylene glycol, acetonitrile, propionitrile, malononitrile, succinonitrile, ethylene glycol monomethyl ether, nitromethane, nitroethane, dimethylformamide, dimethylacetamide, N-methylpyrrolidone, dimethylsulfoxide, hexamethyl phosphoramide, pyridine, and a vinyl polymerization stabilizer in an amount up to 1% by weight to accomplish an addition reaction of the methyl mercaptan and hydrocyanic acid to the acrolein simultaneously with a hydantoin ring forming reaction followed by hydrolysis of the resulting product.

2. A process as claimed in claim 1, wherein gaseous ammonia, liquid ammonia or a source of ammonium ion is employed, said source of ammonium ion selected from the group consisting of ammonium carbonate, ammonium bromide, ammonium chloride, ammonium sulfate, ammonium acetate, ammonium cyanide, ammonium carbamate and ammonium hydrogencarbonate.

3. A process as claimed in claim 1, wherein carbon dioxide gas or a source of carbonate ion is employed, said source of carbonate ion selected from the group consisting of solid carbonic acid, ammonium carbonate, ammonium hydrogencarbonate, ammonium carbamate and sodium carbonate.

4. A process as claimed in claim 1, wherein a compound is employed which is both a source of ammonium ion and a source of carbonate ion.

5. A process according to claim 1 wherein said vinyl polymerization inhibitor is selected from the group consisting of hydroquinone, methoxyhydroquinone, resorcin, bisphenol A, naphthoquinone, naphthylamine, p-phenylenediamine, N-phenol-β-naphthylamine, N,N'-diphenyl-p-phenylenediamine and copper powder.

References Cited

UNITED STATES PATENTS

| 2,485,236 | 10/1949 | Gresham et al. | 260—534 S |
| 3,131,210 | 4/1964 | Hugel et al. | 260—534 S |

FOREIGN PATENTS

| 594,452 | 3/1960 | Canada. | |
| 962,072 | 5/1950 | France | 260—534 S |

LORRAINE A. WEINBERGER, Primary Examiner

J. F. TERAPANE, Assistant Examiner

UNITED STATES PATENT OFFICE
CERTIFICATE OF CORRECTION

Patent No. 3,833,651          Dated September 3, 1974

Inventor(s) SHUNJI OUCHI and CHISEI SHIBUYA

It is certified that error appears in the above-identified patent and that said Letters Patent are hereby corrected as shown below:

Column 1, line 38, in the formula:
"$CH_3 \text{ S·H, catalyst} \xrightarrow{(MA)} CH_3 \text{ S } CH_2CH_2CHO$" should read --

$CH_3SH, \text{ catalyst} \xrightarrow{(MA)} CH_3SCH_2CH_2CHO$ -- .

Column 3, line 51, "hydanation" should read -- hydantoin --;
Column 3, line 60, "hydanatoin" should read -- hydantoin --.
Column 6, line 57, "2N aOH" should read -- 2N NaOH --.

Signed and sealed this 3rd day of December 1974.

(SEAL)
Attest:

McCOY M. GIBSON JR.
Attesting Officer

C. MARSHALL DANN
Commissioner of Patents